United States Patent Office 3,138,643
Patented June 23, 1964

3,138,643
PREPARATION OF TRICHLOROETHANES
Keith M. Taylor, Dickinson, and Gene L. Wofford, Texas City, Tex., assignors to Monsanto Company, a corporation of Delaware
No Drawing. Filed Mar. 15, 1961, Ser. No. 95,786
3 Claims. (Cl. 260—658)

The present invention relates to a process for the preparation of trichloroethanes from dichloroethanes.

It is known that trichloroethanes can be produced directly from ethane or from dichlorinated ethane variously known as ethylene chloride, ethylene dichloride or dichloroethane. Ethane can be reacted with free chlorine in the presence of a small amount of a chlorine carrier such as iodine, antimony or antimony chloride, and iron or a salt of iron such as ferric chloride to yield chlorinated ethanes. However, the usefulness of this process is impaired by the fact that it generally gives rise to a mixture of products of different degrees of chlorination and cannot be controlled to produce any one particular product. This disadvantage more than offsets any advantages arising from the simplicity and cheapness of the process. The known processes for converting dichloroethanes to the trichlorinated derivatives are cumbersome and costly because they either require operation in the liquid phase or the use of catalysts such as phosphorus chloride or molten metal chlorides.

It is, therefore, an object of the present invention to provide a thermal, vapor-phase, non-catalytic process for producing trichloroethanes directly from dichloroethanes whereby high yields of the desired products can be obtained in a simple and economical manner.

It is a further object of the invention to provide a process for the direct chlorination of dichloroethanes whereby formation of tetrachloroethane and higher polychlorinated ethanes which ordinarily predominate in the product obtained from the direct chlorination of dichloroethanes is materially minimized.

These and other objects and advantages of the invention which will become apparent from the following description are accomplished by passing dichloroethane and chlorine in mole proportions in the range from about 3:1 to about 1:3 through a reaction zone heated to a temperature in the rage from about 350° C. to about 500° C. at a rate such that the average residence time of the reaction gases in said reaction zone is in the range from about 0.05 to about 0.5 second.

The invention is illustrated in the following example which, however, is not to be construed as limiting it in any manner whatsoever.

EXAMPLE 1

A series of runs was made in which 1,1-dichloroethane was reacted in the vapor phase directly with chlorine. The reactor employed was a quartz tube 0.8 cm. in outside diameter and of a length selected to give the desired reaction time. Heat to the reactor was supplied by means of an electrical furnace and reaction zone temperature was determined by means of a thermocouple inserted in a 3-mm. O.D. quartz tube centered in the reactor. The dichloroethane was fed from a pressurized reservoir through a rotameter into an electrically heated vaporizer and then into a line where it was premixed with chlorine in the desired mole proportions. The mixed gases were passed through the heated reactor at a rate to give the desired average residence time in the reaction zone. The effluent gases were condensed by passing them consecutively through a series of brine-cooled condensers, an aqueous caustic scrubber to remove HCl and several Dry-Ice traps. Non-condensed gases were vented to the atmosphere. The condensed products were combined, weighed and then analyzed by means of a Perkin-Elmer Model 154 gas chromatograph with a printing integrator.

Results of these runs together with the conditions under which they were obtained are presented in Table I below.

Table I

| Run No. | Charged (Moles) | | Temp. (° C.) | Residence Time (Seconds) | 1,1-$C_2H_4Cl_2$ Conversion (Mole Percent) | |
|---|---|---|---|---|---|---|
| | $C_2H_4Cl_2$ | $Cl_2$ | | | All Prod. | $C_2H_3Cl_3$ |
| 18 | 0.43 | 0.22 | 400 | 0.3 | 49.2 | 49.2 |
| 19 | 0.97 | 0.45 | 400 | 0.3 | 46.4 | 46.4 |
| 1 | 0.21 | 0.24 | 420 | 0.21 | 42.9 | 42.9 |
| 2 | 0.36 | 0.2 | 450 | 0.38 | 52.8 | 50.0 |
| 5 | 0.30 | 0.36 | 450 | 0.28 | 60.0 | 56.7 |
| 10 | 1.23 | 0.61 | 450 | 0.1 | 28.5 | 28.5 |
| 6 | 0.65 | 1.1 | 450 | 0.1 | 44.6 | 43.1 |

It is apparent from the foregoing data that excellent yields of trichlorinated ethanes can be obtained by direct thermal chlorination of dichloroethane under the conditions employed. Little or no higher polychlorinated ethanes are produced using these conditions and the reaction product obtained is a clear water-white liquid.

Some variations in conditions from those given in the example can be made without departing from the scope of the invention. For example, comparable results can be obtained by substituting 1,2-dichloroethane for the 1,1-dichloroethane employed. Conversion of the 1,2-isomer to trichloroethanes is as readily effected under the same conditions.

The reaction can be conducted at temperatures up to about 500° C. and at temperatures as low as 350° C., although operation of the process is preferably carried out at from about 400° C. to about 450° C.

While the preferred mole proportions of dichloroethane to chlorine are those in the range from 2:1 to 1:2, any mole proportions of these reactants in the range from about 3:1 to 1:3 can be used.

Likewise, while residence times from about 0.1 to about 0.4 second provide for optimum conversions and yields, residence times anywhere from 0.05 second to about 0.5 second are suitable for the reaction.

What is claimed is:
1. A process for the production of trichloroethanes from dichloroethanes which consists of reacting a dichloroethane and chlorine in mole proportions of from about 3:1 to about 1:3 in a reaction zone heated to a temperature in the range from about 350° C. to about 500° C., the residence time of the reacting gas mixture in the reaction zone being maintained within the range from about 0.05 to about 0.5 second.

2. A process for the production of trichloroethanes from 1,1-dichloroethane which consists of reacting 1,1-dichloroethane and chlorine in mole proportions of from about 2:1 to about 1:2 in a reaction zone heated to a temperature in the range from about 400° C. to about 450° C., the residence time of the reacting gas mixture in the reaction zone being maintained within the range from about 0.1 to about 0.4 second.

3. A process for the production of trichloroethanes from 1,1-dichloroethane which consists of reacting 1,1-dichloroethane and chlorine in mole proportions of about 2:1 in a reaction zone heated to a temperature of approximately 400° C., the residence time of the reacting gas mixture in the reaction zone being maintained at approximately 0.3 second.

References Cited in the file of this patent
UNITED STATES PATENTS
3,012,081    Conrad et al. _____ Dec. 5, 1961
FOREIGN PATENTS
511,440    Canada _____ Mar. 29, 1955